US012572160B2

(12) United States Patent
Al Hajri et al.

(10) Patent No.: US 12,572,160 B2
(45) Date of Patent: Mar. 10, 2026

(54) MONITORING CORROSION AND FLUSHING CORROSIVE MEDIA FROM DEAD LEGS IN PIPING

(71) Applicant: Saudi Arabian Oil Company, Dhahran (SA)

(72) Inventors: Rashed D. Al Hajri, Baqaiq (SA); Hatim A. Alhamdan, Dhahran (SA); Muhammed H. Al Lutfallah, Al Qatif (SA); Yasser S. Al Subhi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 374 days.

(21) Appl. No.: 18/453,000

(22) Filed: Aug. 21, 2023

(65) Prior Publication Data

US 2025/0068190 A1     Feb. 27, 2025

(51) Int. Cl.
  *G05D 7/06*          (2006.01)
  *G01N 17/04*         (2006.01)
(52) U.S. Cl.
  CPC .......... *G05D 7/0635* (2013.01); *G01N 17/04* (2013.01)
(58) Field of Classification Search
  CPC .............................. G05D 7/0635; G01N 17/04
  USPC ....... 137/551, 487.5; 73/597, 598, 599, 600, 73/86, 627, 629, 630, 602
  See application file for complete search history.

(56) References Cited

U.S. PATENT DOCUMENTS

| | | | | | |
|---|---|---|---|---|---|
| 4,412,174 | A | * | 10/1983 | Conlon | G01N 3/562 |
| | | | | | 324/705 |
| 4,446,736 | A | * | 5/1984 | Jackson | G01N 29/11 |
| | | | | | 73/629 |
| 4,539,846 | A | * | 9/1985 | Grossman | G01N 17/00 |
| | | | | | 422/53 |
| 6,561,032 | B1 | * | 5/2003 | Hunaidi | G01N 29/07 |
| | | | | | 702/171 |
| 8,146,431 | B2 | * | 4/2012 | Yashan | G01N 29/449 |
| | | | | | 73/597 |
| 8,806,944 | B2 | * | 8/2014 | Grubb | G01N 29/223 |
| | | | | | 73/602 |
| 11,174,625 | B2 | * | 11/2021 | Pfeifer | E03C 1/10 |
| 2002/0078752 | A1 | * | 6/2002 | Braunling | G01N 29/07 |
| | | | | | 73/627 |
| 2005/0122121 | A1 | * | 6/2005 | Gilboe | G01N 17/04 |
| | | | | | 324/700 |
| 2005/0274812 | A1 | * | 12/2005 | Taylor | E03B 7/006 |
| | | | | | 236/93 R |
| 2006/0283251 | A1 | * | 12/2006 | Hunaidi | G01N 29/222 |
| | | | | | 73/597 |
| 2009/0199907 | A1 | * | 8/2009 | Aloni | F16T 1/02 |
| | | | | | 137/203 |

(Continued)

FOREIGN PATENT DOCUMENTS

KR          100716760          5/2007

*Primary Examiner* — Minh Q Le
(74) *Attorney, Agent, or Firm* — Fish & Richardson P.C.

(57)          ABSTRACT
Valves for flushing dead legs in piping can include at least one corrosion probe operable to measure a parameter of fluid inside the pipe; an actuator movable between an open position and a closed position to control flow of the fluid through the valve; and a controller in electronic communication with the at least one corrosion probe, and the actuator, the controller configured to operate the actuator based on signals the at least one non destructive test sensor and the at least one corrosion probe.

15 Claims, 4 Drawing Sheets

(56)                    References Cited

U.S. PATENT DOCUMENTS

| | | | |
|---|---|---|---|
| 2012/0090686 A1* | 4/2012 | Lunde | E21B 37/06 |
| | | | 138/109 |
| 2012/0167688 A1* | 7/2012 | Minachi | G01N 29/2468 |
| | | | 73/644 |
| 2013/0191038 A1* | 7/2013 | Wolf | G01B 5/00 |
| | | | 702/34 |
| 2014/0020468 A1* | 1/2014 | Smith | G01N 29/346 |
| | | | 73/597 |
| 2015/0068311 A1* | 3/2015 | Tanaka | G01N 17/00 |
| | | | 73/629 |
| 2016/0202052 A1* | 7/2016 | Smith | G01N 29/12 |
| | | | 73/627 |
| 2022/0196626 A1* | 6/2022 | Liu | E03B 1/048 |

* cited by examiner

100

116

120

118

114

112

110

600

Field Operations
610

Computational Operation(s) 612

Output(s) 622

Computer
System(s) 620

Data 618

MONITORING CORROSION AND FLUSHING CORROSIVE MEDIA FROM DEAD LEGS IN PIPING

TECHNICAL FIELD

The present disclosure generally relates to valves.

BACKGROUND

Dead legs in plants and pipelines are pipe components which do not have continuous flow of fluids. In corrosive environments, dead legs are typically highly exposed to excessive localized corrosion and leaks due to this lack of continuous fluid flow. The forms of localized corrosion can be dependent on the fluid composition. For example, stagnant fluids in upstream facilities can create a driving environment to accelerate the rate of corrosion including under deposit corrosion, microbiologically induced corrosion, and wet sour/sweet corrosion.

Industrially, dead legs are monitored by more frequent and intensive onsite inspection and testing through Nondestructive Testing (NDT) as per API 570 "Process Piping Inspection Code". One of the control methods recommended is flushing dead legs. This can be achieved by opening valves to enable continuous flow and flushing of stagnant residing corrosive products from the dead leg.

SUMMARY

This specification describes systems and methods that inspect pipe thickness, monitor corrosion, and manage flushing of corrosive media from operational dead legs. This approach encompasses a valve with an actuator operated by a controller in communication with NDT sensors and/or probes. The valve enables installation specific flushing of dead legs based on real-time data of process environment/corrosion rate in addition to corrosion monitoring.

The systems and methods described in the specification avoid the need for operators to track flushing, visit the site, and open valves (remotely or at site) required when dead leg flushing is performed manually and at set intervals. In addition, this approach sets the flushing frequency based on by real time data of associated with corrosion which can reduce unnecessary flushing effort in less corrosive dead legs and increase flushing frequency in more corrosive dead legs. This use of real time data can avoid the issues associated the data collection and analysis lag present in many other systems and methods.

These systems and methods can reduce the likelihood of excessive localized corrosion due to a lack of continuous fluid flow in dead legs. Reducing excessive localized corrosion can increase the lifetime of associated assets, reduce maintenance and inspection costs, and reduce the possibility of production interruptions due to emergency repairs. These systems and methods can also reduce the likelihood of leaks due to such excessive localized corrosion. This reduction is significant because such leaks can cause major plant incidents such as fire, vapor cloud explosions, loss of production, or workforce fatality or injury.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods that inspect pipe thickness, monitor corrosion, and manage flushing of corrosive media from operational dead legs. This approach encompasses a valve with an actuator operated by a controller in communication with NDT sensors and/or probes. The valve enables installation specific flushing of dead legs based on real-time data of process environment/corrosion rate in addition to corrosion monitoring.

Figure 1:
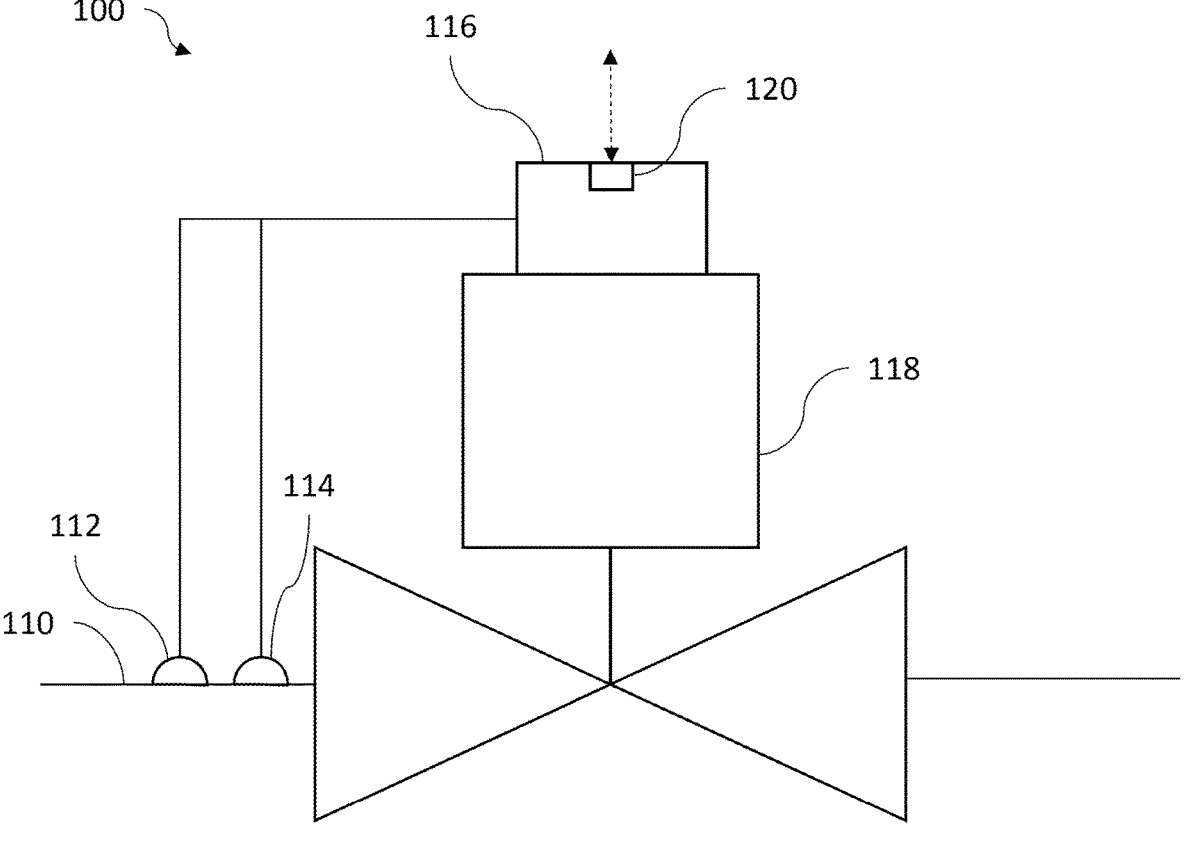
FIG. 1 illustrates a valve for control of corrosion in dead legs.

FIG. 1 illustrates a valve 100 (e.g., a gate valve, a globe valve, plug valve, ball valve or butterfly valve) for control of corrosion in dead legs. The valve 100 is sized to be positioned in a pipe 110. The valve 100 includes at least one non-destructive test sensor 112 operable to detect, measure and characterize a condition parameter of pipe 110 (e.g., wall thickness, pitting, etc) and/or at least one corrosion probe 114 operable to measure a single or multiple corrosion parameter of fluid (e.g., corrosion rate, corrosion current, corrosion voltage, fluid conductivity, electrical resistance, etc) inside the pipe 110. The at least one non-destructive test sensor 112 and/or the at least one corrosion probe 114 are in electronic communication with a controller 116 including a processor. The controller 116 is also in electronic communication with an actuator 118 of the valve 100.

The sensors and/or corrosion probes of the valve 100 are permanently installed in the dead leg of the pipe 110. They can be installed upstream or downstream of valve or both. The type and number of the sensors and/or probes depends on dead leg structure, length, size, and risk of application. For example, a dead leg carrying lethal wet sour hydrocarbon fluid with a pipe 110 length exceeding 10 feet, will at least typically require 3 or more non-destructive test sensors 112 and 3 or more corrosion probes 114 whereas dead leg carrying non-toxic water or condensate with pipe 110 length less than 10 feet will require less than 3 non-destructive test sensors 112 and less than 3 corrosion probes 114.

The controller 116 operates the actuator 118 (e.g., between an open position and a closed position to control flow of the fluid through the valve 100) based on signals from the at least one non destructive test sensor 112 and/or the at least one corrosion probe 114. For example, the controller 116 can move the actuator 118 from its closed position to its open position to flush the dead leg when the at least one non destructive test sensor 112 reports changing pipe condition indicating corrosion is occurring, when the at least one corrosion probe 114 indicates a corrosive environment is present, or both.

The non-destructive test sensor 112 of the valve 100 reads the actual wall thickness of the dead leg and transmits the thickness reading signals to the controller 116 at set intervals. The processor of the controller 116 calculates the actual corrosion rate based on multiple thickness readings and the time between them. The intervals between readings (e.g., daily, weekly, or monthly) are chosen based on factors that include the consequence of failure, remaining life calculated by corrosion rate, and fluid corrosivity.

Similarly, the corrosion probe 114 of the valve 100 reads the corrosion current, corrosion voltage, fluid conductivity, electrical resistance, etc, converts the readings to a corrosion rate and transmits the corrosion rate readings to the controller 116 at set intervals. The processor of the controller 116 monitors the upstream or downstream environment based on the readings.

The controller 116 determines the corrosion rate of the pipe 110 upstream or downstream of the valve. Thickness and/or data readings from one or combination of multiple sensors/probes analyzed to determine the corrosion rate. The corrosion rates from the sensors and probes can be averaged or decisions based on the highest reading taken. When corrosion rate reaches or exceeds a threshold set by operator, the controller 116 opens the valve 100 to flush the corrosive stagnant products contained in the dead leg. For example, in oil and gas industry, a corrosion rate of 5 mpy is typically used as threshold. After a preset opening interval, the valve 100 closes. This approach avoids the need for tracking and manually performing flushing tasks.

The valve 100 includes a communication module 120. In the illustrated valve, the communication module 120 is incorporated in the controller 116 and includes a transceiver operable to send signals representing valve and dead leg conditions and/or receive and relay command signals to the processor 116. Although some valves for corrosion control do not include a communication module and operate independently, most valves 100 for corrosion control include at least a transmitter operable to send signals representing valve and dead leg conditions. For example, such valves can send signals to a facility control center indicating when they have been operated. Some communication modules 120 include a transmitter and a separate receiver rather than a transceiver.

In operation sensitive applications (e.g., dead legs with which a valve closure will causes operations interruption or major production reduction), the controller 116 can be switched from corrosion rate logic to remote operation by operators or to requesting operator permission before taking action. This approach can mitigate the impact of flushing on operations. In addition, the data sent from the controller to a facility control center can be used to trigger having an inspector visit the site and perform inspection of dead legs. By triggering site visits based on actual corrosion conditions, inspectors' time is focused on areas that are most problematic.

The non-destructive test sensor 112 of the valve 100 is typically an ultrasonic tester. Some valves for corrosion control use other non-destructive test sensor (e.g., ultrasonic test sensor(s), guided wave sensor(s), or Electro Magnetic Acoustic Transducer (EMAT) sensor(s)).

The at least one corrosion probe 114 is typically a Linear Polarization Probe (LPR). Some valves for corrosion control use other corrosion probe(s) (e.g., electrical resistance probe(s)).

Figure 2:
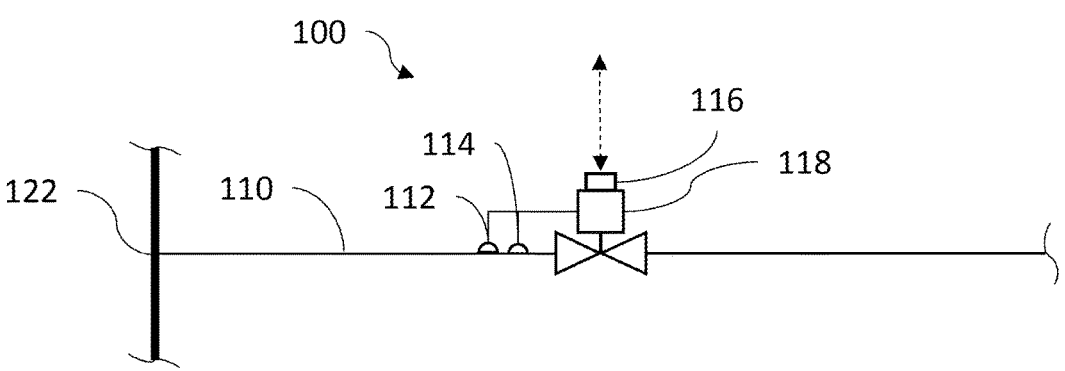
FIG. 2 is a schematic view illustrating the valve of FIG. 1 installed in a branch operational dead leg.
Figure 3:
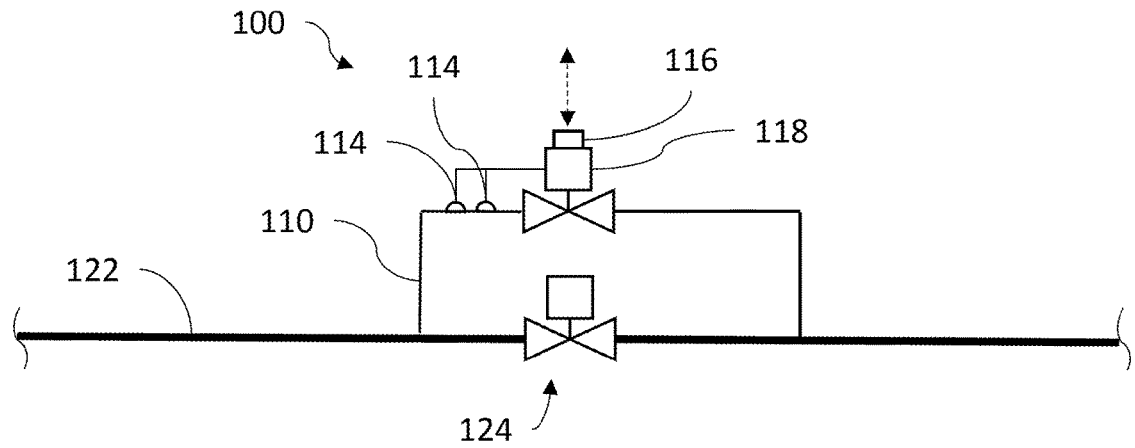
FIG. 3 is a schematic view illustrating the valve of FIG. 1 installed in a bypass line.
Figure 4:
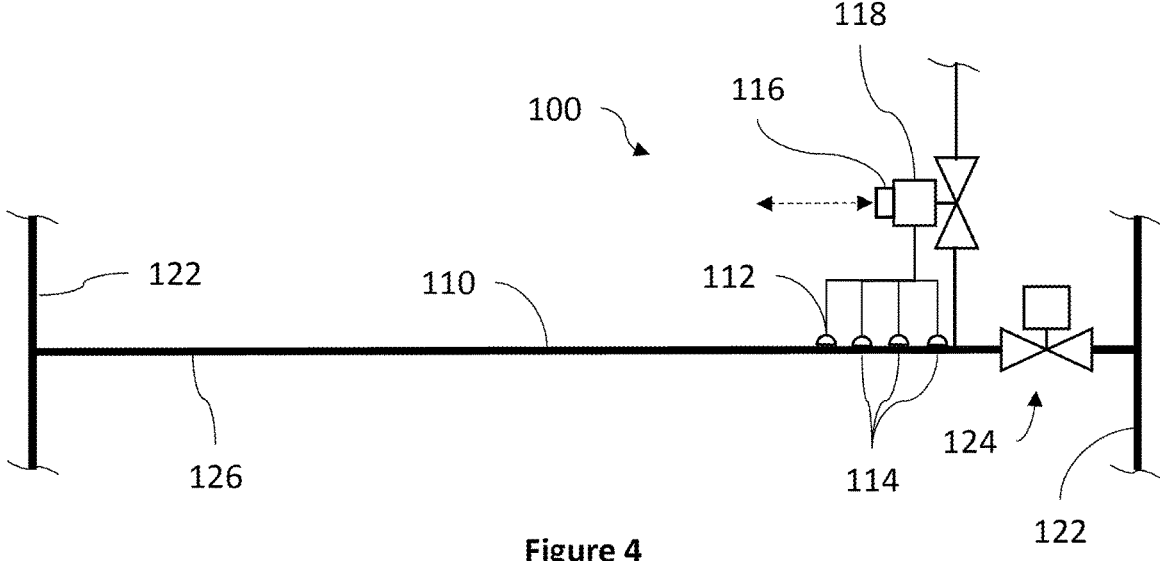
FIG. 4 is a schematic view illustrating the valve of FIG. 1 installed in a branch operational dead leg connecting two operational lines.

FIGS. 2-4 illustrate example applications for the valves 100.

FIG. 2 is a schematic view illustrating the valve 100 installed in a branch operational dead leg to enable flushing. In this application, the pipe 110 extends from an operating line 122 and discharges to downstream closed systems (e.g., blowdown(s) or flare header(s)). This implementation of the valve 100 includes a single non-destructive test sensor 112 and a single corrosion probe 114.

FIG. 3 is a schematic view illustrating the valve 100 installed in a bypass of the operating line 122. In this application, a conventional valve 124 is installed in the operating line 122. The pipe 110 is a line bypassing the conventional valve 124. The valve 100 controlling the bypass line (i.e., the pipe 110) is usually closed with the bypass line forming the dead leg. This situation is relatively low risk since flushing the pipe 110 does not significantly change the fluid in the operating line 122 downstream of the conventional valve 124 or impact downstream operations. This implementation of the valve 100 includes two corrosion probes 114 without a non-destructive test sensor 112 as corrosion probes are less expensive than non-destructive test sensors and are easier to install. In some other applications, a single or multiple equipment can be bypassed (e.g. tank, pressure vessel) instead of conventional valve 124 in FIG. 3.

FIG. 4 is a schematic view illustrating the valve 100 installed in a branch line 126 connecting two operational lines 122. The pipe 110 extends from the end of a dead leg of the branch line adjacent the conventional valve 124. This implementation of the valve 100 includes a single non-destructive test sensor 112 and three corrosion probes 114. Although the valve 100 controls flow through the discharge line formed by the pipe 110, the non-destructive test sensor 112 and the three corrosion probes 114 are installed in branch line 126.

Figure 5:
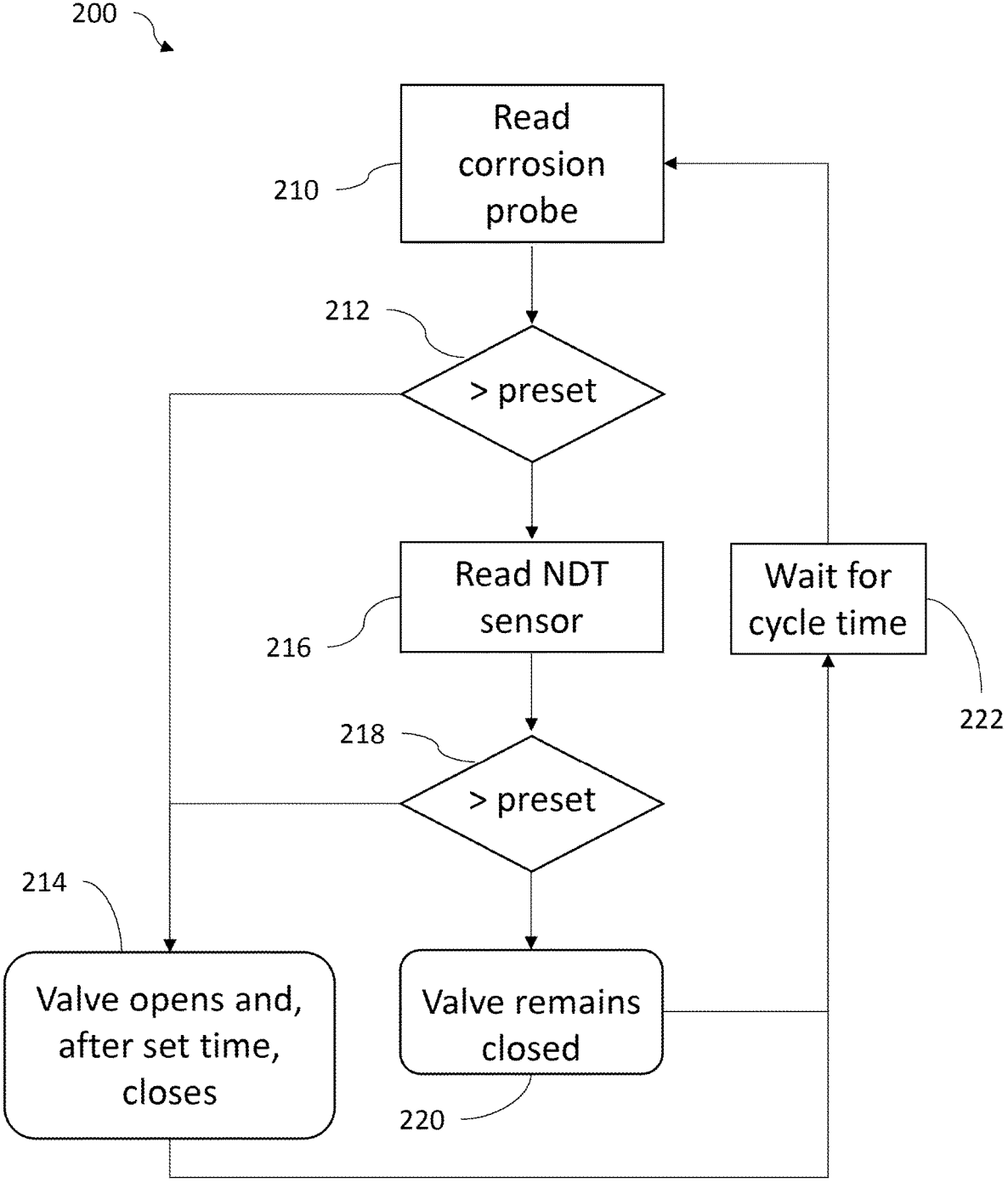
FIG. 5 is a flow chart illustrating a method of controlling corrosion and a dead-leg using a corrosion control valve.

FIG. 5 is a flow chart illustrating a method 200 of monitoring and controlling corrosion in a dead leg using a corrosion control valve. The method 200 is explained with reference to the components of the implementation of the valve 100 shown in FIG. 1.

The corrosion probe(s) is read and corrosion probe readings are transmitted to the controller 116 (step 210). The controller 116 analyzes the readings as well as storing or transmitting the readings into a storage media for operator analysis and action. If the corrosion probe readings (either in average over time or average from multiple probes or both) exceed a threshold of corrosion rate set by operator (step 212), the controller 116 transmits a signal to the actuator 118 to open the valve 100 for a set period (step 214). An appropriate time for the valve to be open can be estimated by dividing the volume of the dead leg by the flow rate of fluid through the valve for controlling corrosion and multiplying the result by a safety factor (e.g., 2 or 3). After the set period, the valve 100 closes.

If the corrosion probe readings have not triggered flushing, the non-destructive test sensor(s) is also read and the readings are transmitted to the controller 116 (step 210). The controller 116 analyzes the readings as well as storing or transmitting the readings into a storage media for operator analysis and action. If the non-destructive test sensor readings (either in average of days or average from multiple sensors or both) exceed a threshold of corrosion rate set by operator (step 218), the controller 116 transmits a signal to the actuator 118 to open the valve 100 for a set period (step 214). An appropriate time for the valve to be open can be estimated by dividing the volume of the dead leg by the flow rate of fluid through the valve for controlling corrosion and multiplying the result by a safety factor (e.g., 2 or 3). After the set period, the valve 100 closes.

In this implementation of the method 100, flushing occurs if either of the probe or sensor data meets the preset criteria. If neither of the criteria are met, the valve 100 remains closed (step 220). When the valve 100 is closed after flushing or remains closed after readings, the controller 116 waits for a cycle time before starting the process again. In view of the time frames for corrosion, it is anticipated that cycle times on the order of days to weeks will be appropriate.

Figure 6:
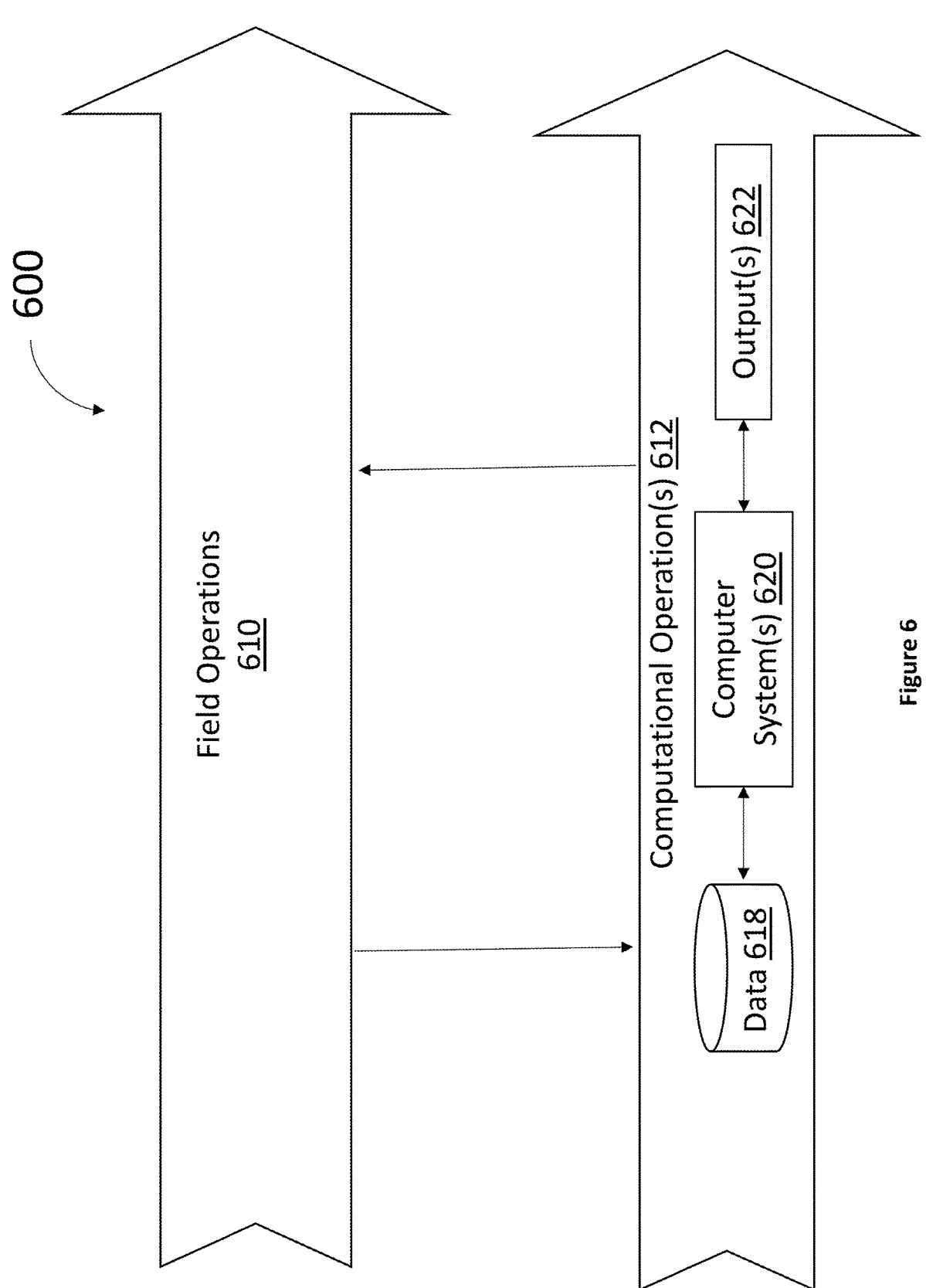
FIG. 6 illustrates hydrocarbon production operations that include both field operations and computational operations, which exchange information and control the production of hydrocarbons.

FIG. 6 illustrates hydrocarbon production operations 600 that include both one or more field operations 610 and one or more computational operations 612, which exchange information and control exploration for the production of hydrocarbons. In some implementations, outputs of techniques of the present disclosure can be performed before, during, or in combination with the hydrocarbon production operations 600, specifically, for example, either as field operations 610 or computational operations 612, or both.

Examples of field operations 610 include forming/drilling a wellbore, hydraulic fracturing, producing through the wellbore, injecting fluids (such as water) through the wellbore, to name a few. In some implementations, methods of the present disclosure can trigger or control the field operations 610. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 610 and responsively triggering the field operations 610 including, for example, generating plans and signals that provide feedback to and control physical components of the field operations 610. Alternatively or in addition, the field operations 610 can trigger the methods of the present disclosure. For example, implementing physical components (including, for example, hardware, such as sensors) deployed in the field operations 610 can generate plans and signals that can be provided as input or feedback (or both) to the methods of the present disclosure.

Examples of computational operations 612 include one or more computer systems 620 that include one or more processors and computer-readable media (e.g., non-transitory computer-readable media) operatively coupled to the one or more processors to execute computer operations to perform the methods of the present disclosure. The computational operations 612 can be implemented using one or more databases 618, which store data received from the field operations 610 and/or generated internally within the computational operations 612 (e.g., by implementing the methods of the present disclosure) or both. For example, the one or more computer systems 620 process inputs from the field operations 610 to assess conditions in the physical world, the outputs of which are stored in the databases 618. For example, seismic sensors of the field operations 610 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 612 where they are stored in the databases 618 and analyzed by the one or more computer systems 620.

In some implementations, one or more outputs 622 generated by the one or more computer systems 620 can be provided as feedback/input to the field operations 610 (either as direct input or stored in the databases 618). The field operations 610 can use the feedback/input to control physical components used to perform the field operations 610 in the real world.

For example, the computational operations 612 can process the seismic data to generate three-dimensional (3D) maps of the subsurface formation. The computational operations 612 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 612 to process new information about the formation and control the drilling to adjust to the observed conditions in real-time.

The one or more computer systems 620 can update the 3D maps of the subsurface formation as information from one exploration well is received and the computational operations 612 can adjust the location of the next exploration well based on the updated 3D maps. Similarly, the data received from production operations can be used by the computational operations 612 to control components of the production operations. For example, production well and pipeline data can be analyzed to predict slugging in pipelines leading to a refinery and the computational operations 612 can control machine operated valves upstream of the refinery to reduce the likelihood of plant disruptions that run the risk of taking the plant offline.

In some implementations of the computational operations 612, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

EXAMPLES

In an example aspect, a valve for flushing dead legs in piping includes: at least one corrosion probe operable to measure a parameter of fluid inside the pipe; an actuator movable between an open position and a closed position to control flow of the fluid through the valve; and a controller in electronic communication with the at least one corrosion probe, and the actuator, the controller configured to operate the actuator based on signals the at least one non destructive test sensor and the at least one corrosion probe In an example aspect combinable with any other example aspect, valves also include a transmitter in electronic communication with the processor, the transmitter operable to send signals representing valve conditions.

In an example aspect combinable with any other example aspect, valves also include a receiver in electronic communication with the processor, the receiver operable to receive and relay command signals to the processor.

In an example aspect combinable with any other example aspect, valves also include at least one non-destructive test sensor operable to measure a parameter of pipe.

In an example aspect combinable with any other example aspect, the at least one non-destructive test sensor includes at least one of an ultrasonic test sensor, a guided wave sensor, or an Electro Magnetic Acoustic Transducer (EMAT) sensor.

In an example aspect combinable with any other example aspect, the at least one corrosion probe includes at least one of an electrical resistance probe, or a linear polarization resistance probe.

In an example aspect combinable with any other example aspect, the controller is configured to activate the at least one non-destructive test sensor and the at least one corrosion probe at a set interval.

In an example aspect combinable with any other example aspect, the set interval is between daily and monthly.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A valve for flushing dead legs in piping, the valve comprising:
    at least one non-destructive test sensor operable to measure a parameter of pipe;
    at least one corrosion probe operable to measure a parameter of fluid inside the pipe;
    an actuator movable between an open position and a closed position to control flow of the fluid through the valve; and
    a controller in electronic communication with the at least one non destructive test sensor, the at least one corrosion probe, and the actuator, the controller configured to operate the actuator based on signals the at least one non destructive test sensor and the at least one corrosion probe.

2. The valve of claim 1, further comprising a transmitter in electronic communication with the processor, the transmitter operable to send signals representing valve conditions.

3. The valve of claim 2, Further comprising a receiver in electronic communication with the processor, the receiver operable to receive and relay command signals to the processor.

4. The valve of claim 1, wherein the at least one non-destructive test sensor comprises at least one of an ultrasonic test sensor, a guided wave sensor, or an Electro Magnetic Acoustic Transducer (EMAT) sensor.

5. The valve of claim 4, wherein the at least one corrosion probe comprises at least one of an electrical resistance probe, or a linear polarization resistance probe.

6. The valve of claim 1, wherein the controller is configured to activate the at least one non-destructive test sensor and the at least one corrosion probe at a set interval.

7. The valve of claim 6, wherein the set interval is between daily and monthly.

8. A valve for flushing dead legs in piping, the valve comprising:
    at least one corrosion probe operable to measure a parameter of fluid inside the pipe;
    an actuator movable between an open position and a closed position to control flow of the fluid through the valve; and
    a controller in electronic communication with the at least one corrosion probe, and the actuator, the controller configured to operate the actuator based on signals the at least one non destructive test sensor and the at least one corrosion probe.

9. The valve of claim 8, further comprising a transmitter in electronic communication with the processor, the transmitter operable to send signals representing valve conditions.

10. The valve of claim 8, further comprising a receiver in electronic communication with the processor, the receiver operable to receive and relay command signals to the processor.

11. The valve of claim 8, further comprising at least one non-destructive test sensor operable to measure a parameter of pipe.

12. The valve of claim 11, wherein the at least one non-destructive test sensor comprises at least one of an ultrasonic test sensor, a guided wave sensor, or an Electro Magnetic Acoustic Transducer (EMAT) sensor.

13. The valve of claim 12, wherein the at least one corrosion probe comprises at least one of an electrical resistance probe, or a linear polarization resistance probe.

14. The valve of claim 13, wherein the controller is configured to activate the at least one non-destructive test sensor and the at least one corrosion probe at a set interval.

15. The valve of claim 14, wherein the set interval is between daily and monthly.

* * * * *